Oct. 23, 1928. O. L. COFFEY Re. 17,116

DROP PIT MECHANISM FOR UNWHEELING LOCOMOTIVES

Original Filed Jan. 10, 1925 4 Sheets-Sheet 1

Inventor:
Oscar L. Coffey
By Cheever & Cox
Atty's

Oct. 23, 1928. O. L. COFFEY Re. 17,116

DROP PIT MECHANISM FOR UNWHEELING LOCOMOTIVES

4 Sheets-Sheet 2

Original Filed Jan. 10, 1925

Inventor:
Oscar L. Coffey
By Cheever & Cox Attys.

Oct. 23, 1928. O. L. COFFEY Re. 17,116

DROP PIT MECHANISM FOR UNWHEELING LOCOMOTIVES

Original Filed Jan. 10, 1925 4 Sheets-Sheet 3

Inventor:
Oscar L. Coffey
By Cheever & Cox
Atty's.

Oct. 23, 1928. O. L. COFFEY Re. 17,116
DROP PIT MECHANISM FOR UNWHEELING LOCOMOTIVES
Original Filed Jan. 10, 1925 4 Sheets-Sheet 4
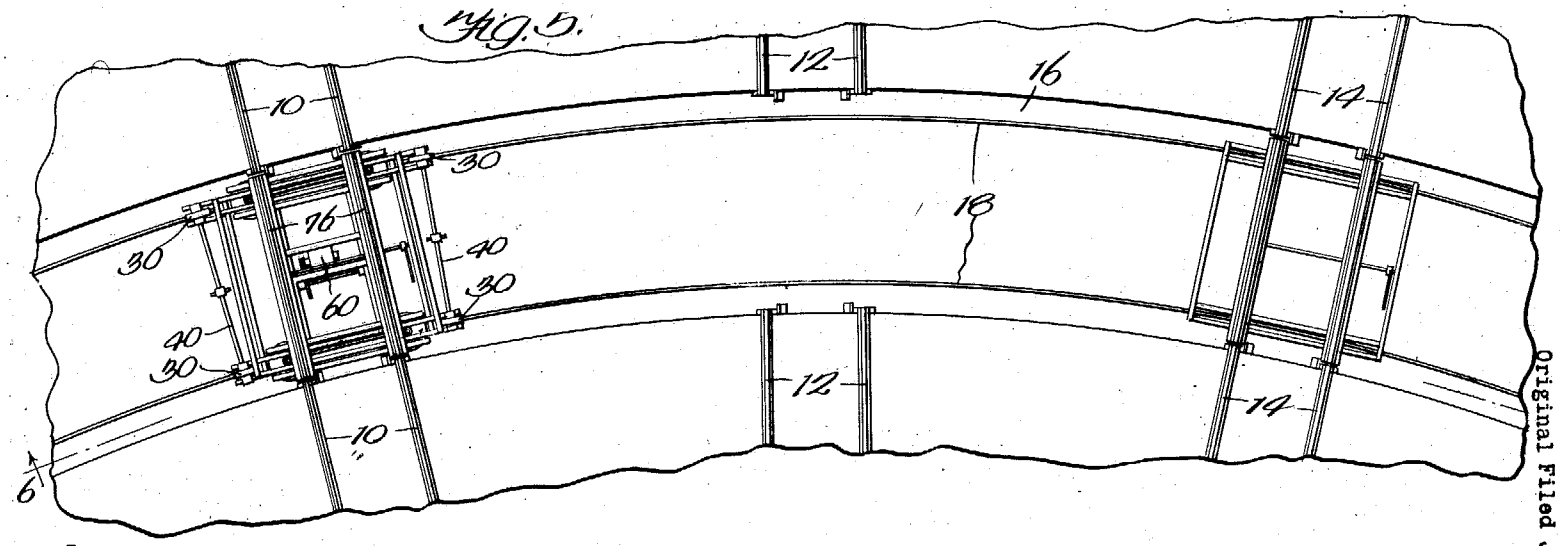
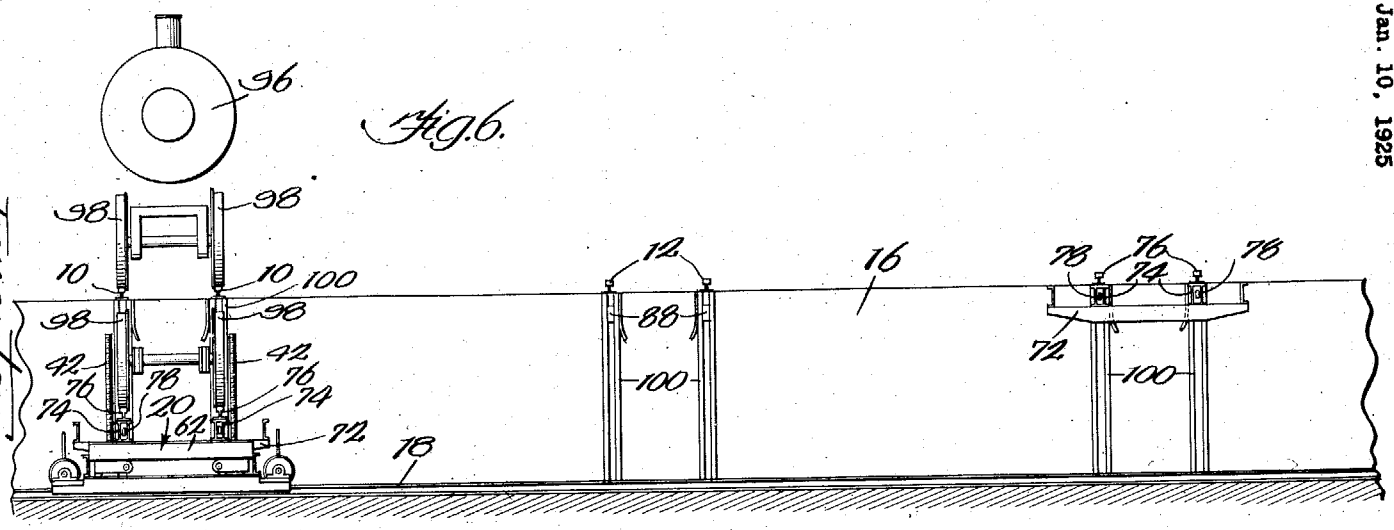
Inventor:
Oscar L. Coffey
By Cheever & Cox Att'ys.

Reissued Oct. 23, 1928.

Re. 17,116

UNITED STATES PATENT OFFICE.

OSCAR L. COFFEY, OF HARVEY, ILLINOIS, ASSIGNOR TO WHITING CORPORATION, OF HARVEY, ILLINOIS, A CORPORATION OF ILLINOIS.

DROP-PIT MECHANISM FOR UNWHEELING LOCOMOTIVES.

Original No. 1,564,828, dated December 8, 1925, Serial No. 1,518, filed January 10, 1925. Application for reissue filed September 10, 1928. Serial No. 305,085.

This invention relates to so-called drop pits for removing heavy wheels from vehicles of various kinds, specifically: railroad locomotives. The principal object of the invention is to provide a pit construction and wheel carrying mechanism operating therein adapted to transport a pair of wheels from a vehicle, such as a locomotive, to a point on another track in such a position and condition that they may be rolled away for work to be done upon them.

The invention consists in mechanism capable of attaining the foregoing and other objects; which can be comparatively easily and cheaply made; which is satisfactory in use and is not readily liable to get out of order, and particularly in such a device which is operative to selectively transport wheels from separate locomotives on a multiplicity of separated tracks to a common point of delivery of the wheels for work thereon.

More particularly the invention consists in numerous features and details of construction which will be hereafter more fully described in the specification and claims.

Referring to the drawings in which like numerals designate like parts throughout the several views:

Figure 5 is a plan view of the complete pit, equipped with the mechanism of this invention, showing the same applied in curved form as would be required if applied in or in proximity to a round house.

Figure 6 is a side elevation, taken on line 6—6 of Figure 5.

Figure 1:
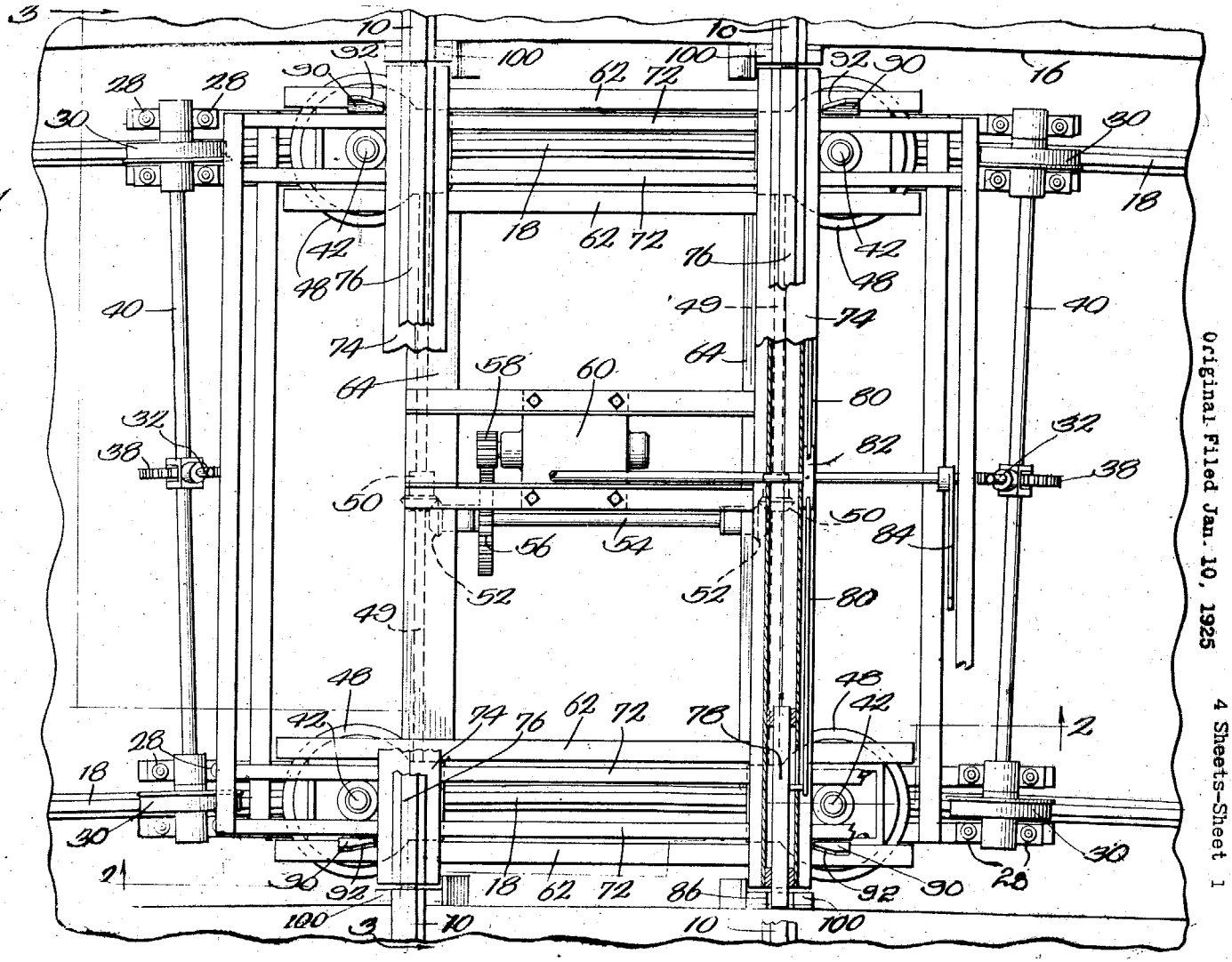
Figure 1 is a plan view of mechanism illustrating this invention in its preferred form.

The mechanism of this invention is applicable to a multiplicity of adjacent but spaced railroad tracks 10—12 and 14 crossing the top of an intersecting pit 16, preferably but not necessarily entirely open at its top, there being in the bottom of the pit a track 18 along which the wheel transporting trolley 20 travels across the lines of tracks 10—14. This trolley 20 is, in the particular case here illustrated, made up of side frames 22 and cross beams 24, rigidly connected thereto, the side frames including blocks 26 located over the rails 18 and adapted when the load on the trolley exceeds a certain point to, through the spring construction 28, interposed between the trolley and its supporting wheels 30, rest upon the track rails 18 and thus take the strain off the wheels, all as more fully described and claimed in the companion application (Serial No. 1,517) for Patent No. 1,586,783 dated June 1, 1926. The trolley as a whole is propellable along the rails 19 by any suitable means, in the particular case here illustrated by the rocking of hand manipulatable levers 32, equipped with ratchet dogs 34 selectively engageable with the teeth 36 on ratchet wheel 38, on the shaft 40 of the adjacent wheels 30, all as more fully described and shown in said companion application.

Rising from and rigidly attached to four corners of the trolley 20 are four load carrying screws 42, each having threaded thereon a worm wheel 44 meshing with a suitable worm 46 enclosed in an oil or grease retaining case 48. The worms 46 are connected together in pairs by shafts 49, each carrying a bevel pinion 50 meshing with another bevel pinion 52. These two last mentioned pinions are on a common shaft 54 carrying a gear 56 driven by a pinion 58 on the shaft of an electric motor 60 or other suitable source of power, receiving its energy from a source not shown, outside the machine. Each two cases 48 over a given track rail 18 are rigidly connected to box girders 62 made up, as clearly shown in Figures 3 and 4, of spaced channel irons. Each two cases 48, which are opposite each other transversely of the track are connected together by cross-beams 64 rigidly secured in position by any suitable means, as, for instance, the angles 66, suitably secured to these cross-beams and the adjacent channels of the box girders 62. The box girders 62 are equipped with spreaders 68, carried by bolts 70 which insure the side channel irons of the girders being almost the same distance apart and consequently capable of separably interfitting, as shown in Figure 3, with depending members—in the particular case here illustrated, longitudinally disposed girders 72, extending parallel with rails 18 and forming a part of wheel sustaining table 74, equipped with rail sections 76, selectively interfittable with at least one of the tracks as 10 or 14 which carry the locomotives and the track, as 12, on which the removed wheels are finally disposed of.

The table is composed of a pair of girders under each rail-section 76 and additional girders outside of the girders under the rail sections, to support side platforms.

Figure 3:
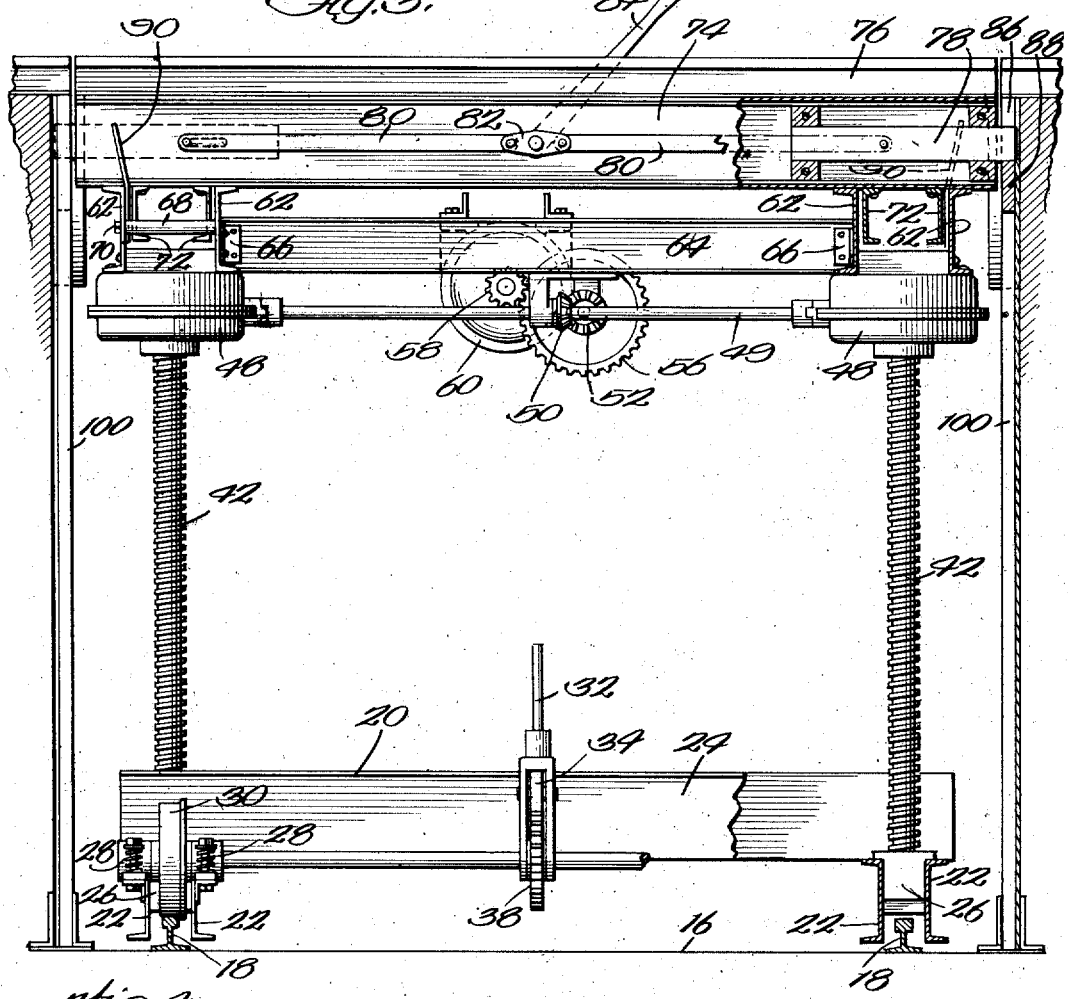
Figure 3 is an end elevation taken on the irregular line 3—3 of Figure 1.

The wheel table 74 is equipped with reciprocal latch bars 78 manipulatable through the agency of connecting rods 80, toggles 82 and hand lever 84, from the position shown in Figure 3 where the ends of the latches enter slots 86 in the side walls of the pit 16, and rest upon stationary supports 88 to a retracted position in which they are drawn inward sufficiently to clear these supports and thus permit the wheel table to rest upon and travel with the upper frame 62—64 as more fully appears hereafter. From the foregoing, it clearly appears that the wheel table 74 can be locked in position in the tracks 10—12 or 14 and that when so positioned the frame 62—64 can be lowered and the trolley 20 can then be run along track 18 (as shown in Figure 4) without in any way interfering with such locked in position wheel table 74.

Figure 4:
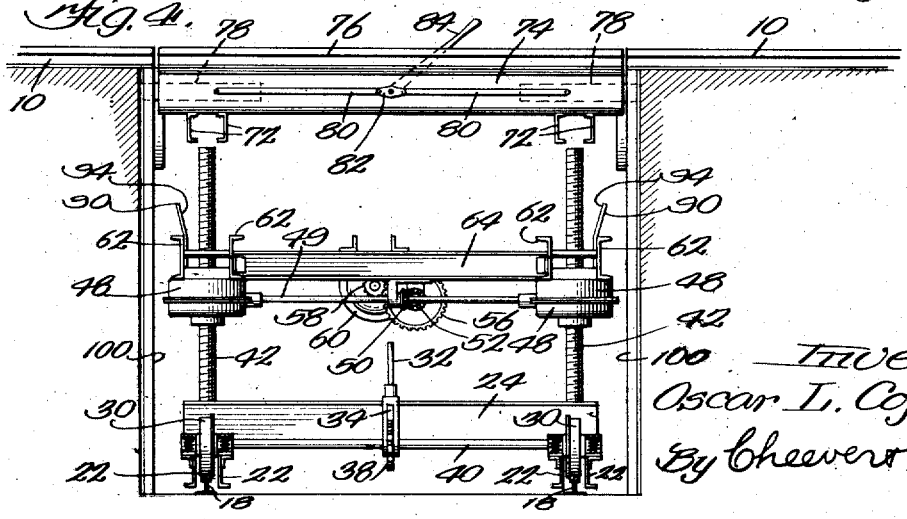
Figure 4 is a reduced size, changed position view of the parts of Figure 3 taken from the extreme right hand end of Figure 1.

Upwardly projecting guides 90 having faces 92 and 94 angularly inclined in planes at approximately right angles to each other insure the accurate interfitting of the lifting mechanism and the wheel-carrying table 74 when the operator causes the lifting mechanism to move from the position of Figure 4 upward to the position of Figure 3.

Attention is called to the fact (clearly shown in Figure 4) that the tops of the screws 42 amply clear the projecting members, specifically the girders 72 on the lower side of wheel tables 74, the significance being that as many tracks 10—14 as desired, intersected by the pit 16, may be provided, all of said tracks except one being equipped with a wheel table 74 and that the trolley 20 may then go to any track having a table 74, connect up with that table as shown in Fig. 3, have the latches 78 released, and then lower the table 74 to a point below the tops of the screws 42 and thereupon carry said table under the tables of any other intervening tracks to the opening in the track which did not initially have a wheel table, and by raising the carrying wheel table, place it in that track. This is of importance in that the mechanism is capable of serving a multiplicity of tracks to deliver wheels from locomotives on those tracks to a common track, as 12, for work upon those wheels, this while leaving all of the tracks, except the service track 12, complete so that locomotives or other machines to be dewheeled can move at will over the different tracks, regardless of the position of the trolley 20 along the rails 18 in pit 16. This lowering of the table 74 to the position in Figure 4 is rendered possible, as clearly shown in Figure 1, by omitting all obstructions in alignment with the screws 42 from the table structure 74.

Figure 2:
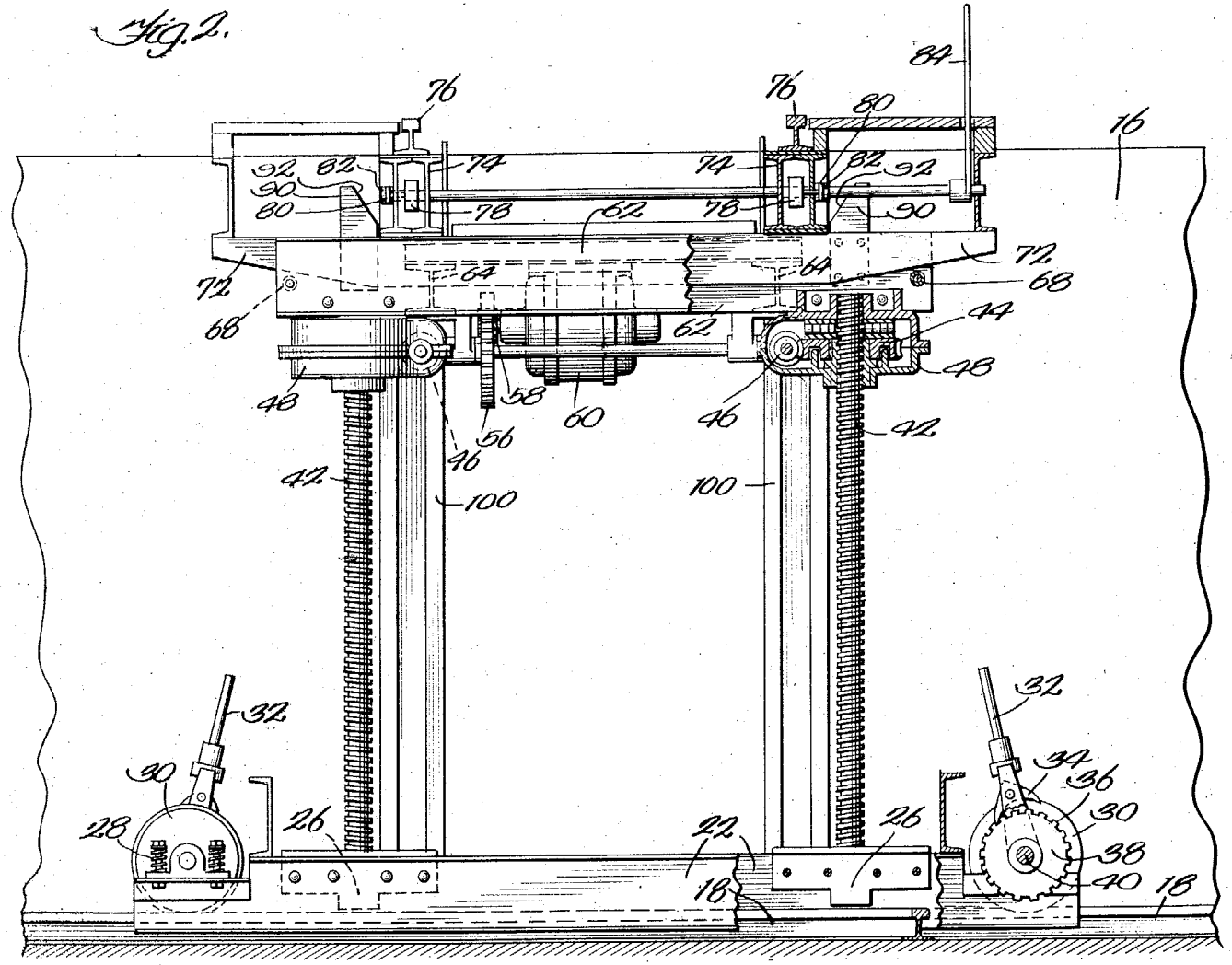
Figure 2 is a side elevation taken on the irregular line 2—2 of Figure 1.

In the operation of the entire mechanism, assume that the parts are in initial position of all the figures, except Figure 4, and that a locomotive 96 is standing with its wheel 98 on rail sections 76 of the table 74, installed for the time being, if not regularly belonging in track 10. The operator now starts motor 60 to ultimately rotate worm wheels 44 in unison to slightly raise lifting frame 62—64 and consequently wheel table 74 and wheels 98 to a point at which latches 78 can be freely withdrawn by the operator easily manipulating lever 84. If this upward movement has applied too much of the weight of the entire locomotive to the lifting mechanism, springs 28 compress and blocks or shoes 22 settle upon the rails 18, thus taking the load off wheels 30 as described and claimed in the companion application, heretofore mentioned. When this extreme upward position is reached, the motor 60 is stopped and the operator blocks up or otherwise secures the springs, not shown, on the locomotives and detaches the wheels 98 which now rest only upon rail section 76 of table 74. The operator now starts the motor 60 in the opposite direction, thus causing the entire mechanism shown at the top of Figure 1 and between the guides 100 on opposite pit walls to descend to such point along screws 42, say the position of Figure 4 or lower, wherein the lifting mechanism and the wheels 98 thereon entirely clear the wheel table 74 in any other track 1—14 under which the wheel is to be carried. The moment the wheels 98 descend to a point where they only are carried by the table 74, the springs 28 return the blocks 22 to the normal position of Figure 2 in which they slightly clear the rails 18. When the wheels have been lowered sufficiently, the operators manipulate one or both of the levers 32 to propel the trolley 20 and everything on it along the pit until the table 74, which has just been removed from track 10 is in proper position with reference to the service track, say track 12, on which the wheels are to be taken away. The operator having stopped motor 60 before manipulating levers 32 now starts the motor to cause upward movement of the table 74. This movement is continued until the latches 78 are in position to slip over the supports 88 belonging to that particular track, as 12, whereupon the lever 84 is manipulated to throw those latches into extended position. The motor 60 is now operated to lower the lifting mechanism until these latches actually rest upon supports 88 of the particular track, as 12, in which the table 74 has been placed. In this condition of affairs, the wheels 98 may be rolled off upon the adjacent track, as 12. The table 74, which has thus been brought and placed in track 12, may now be returned to original position in track 10 by reversing the operations described or this table may be left indefinitely in track 12 and the machine manipulated in obvious manner until the parts assume the position of Figure 4 whereupon the trolley 20 can be moved along the track 18 to another track, as 14, whose table 74, with or without wheels thereon, is to be transported into any track 10—14 which has no table 74 in it, under the conditions just described, track 10.

The drawings show a completely open pit 16 but there is nothing in the structure of the invention which requires any surface opening between the tables 74 in elevated position or the respective adjacent tracks. In other words, if the pit is made deep enough and the screws 42 are made of corresponding length, the table 74 and wheels thereon may be carried down to a sufficient depth in the pit 16 to carry the wheels under any desired roof construction placed over the top of the pit. In this aspect, the invention is usable in transporting a track table between two adjoining pit top openings in the same track as well as under the conditions shown, wherein the effective openings are in parallel tracks.

In the specific embodiment of the invention, the pit 16 is curved from the center of intersection below Figure 5 of tracks 10—14. Obviously, if the tracks were parallel to each other, the pit 16 would be straight and at right angles thereto.

The construction illustrated exemplifies mechanism of the class described in which; the power mechanism for manipulating the lifting carriage includes an electric motor, and gearing operated thereby mounted on and to travel with the table-engaging carriage or frame; power-mechanism which includes pairs of worms mounted on the table-engaging carriage and driven by a pair of parallel motor-driven shafts; the tables are built-up of girders to form a rigid structure; the tables and lifting carriage are formed of girders adapted to interfit or lap one another; the tables comprise a pair of longitudinal girders under each rail-section and cross-girders underlying them; the lifting carriage has girders which pass or straddle the cross-girders of a table to directly engage its longitudinal girders; the tables are extended laterally of the rail-sections with girders at the sides thereof; the gears on the screws are confined in lubricant containing cases; the screws pass between pairs of girders on the lifting carriage and lubricant retaining cases fixed to and underlying said pairs of girders, so the carriage will be supported by the cases; the electric motor is mounted between the girders of the lifting-carriage; the table-latching bolts underlie the rail-sections on the table, are within the horizontal plane of the girders of the table, and are mounted within pairs of table-girders; the cross-girders are disposed on top of the longitudinal girders of the trolley so parts on the lifting carriage may be lowered between them; the stationary screws are fixed in blocks secured between longitudinal girders of the trolley; the trolley may be manually propelled independently of the electric motor on the lifting carriage; the lifting carriage of girder construction is provided with a set of guides to relatively position and retain a table on the lifting carriage; so that the mechanism is specially adapted for heavy-duty service in connection with locomotives, and so that the table and carriage can be operated vertically between the table-releasing and the wheel-transferring positions in a pit of the minimum height necessary for transferring locomotive wheels under other tables.

I claim:

1. In mechanism of the class described, the combination with means passing a wheeled vehicle over the ground, a pit below it having wheel tables each equipped with means detachably latching it across the pit, and a track in the bottom of the pit passing under said tables, of a trolley travelable along said track, a table elevating carriage, engageable with and separable from a table, on and reciprocal vertically above the trolley, and movable between a position where it engages and lifts a table high enough so its latching mechanism may be released and a position low enough so that the trolley with said table and the wheeled load therein may move along said track under one other such wheel table, and mechanism for raising and lowering said carriage comprising a motor fixedly mounted on and movable vertically with the table-engaging carriage.

2. In mechanism of the class described, the combination with means passing a wheeled vehicle over the ground, a pit below it having wheel tables each equipped with means detachably latching it across the pit, and a track in the bottom of the pit passing under said tables, of a trolley travelable along said track, a table elevating carriage engageable with and separable from a table, on and reciprocal vertically above the trolley, and movable between a position where it engages and lifts a table high enough so its latching mechanism may be released and a position low enough so that the trolley with said table and the wheeled load thereon may move along said track under one other such wheel table, mechanism for raising and lowering said carriage comprising a motor and gearing driven by the motor, said gearing and motor being mounted on and vertically movable with the table-engaging carriage.

3. In mechanism of the class described, the combination with means passing a wheeled vehicle over the ground, a pit below it having wheel tables each equipped with means detachably latching it across the pit, and a track in the bottom of the pit passing under said tables, of a trolley travelable along said track, a table elevating carriage engageable with and separable from a table, on and reciprocal vertically above the trolley and movable between a position where it engages and lifts a table high enough so its latching mechanism may be released and a position low enough so that the trolley with said table and the wheeled load thereon may move along said track under one other such wheel table, and mechanism for raising and lowering said carriage comprising, screws having their lower ends mounted on the trolley and extended vertically for the entire travel of the carriage, and rotatable elements mounted on and movable vertically with the table engaging carriage, and engaging said screws.

4. In mechanism of the class described, the combination with means passing a wheeled vehicle over the ground, a pit below it having wheel tables each equipped with means detachably latching it across the pit, and a track in the bottom of the pit passing under said tables, of a trolley travelable along said track, a table elevating carriage engageable with and separable from a table, on and reciprocal vertically above the trolley and movable between a position where it engages and lifts a table high enough so its latching mechanism may be released and a position low enough so that the trolley with said table and the wheeled load thereon may move along said track under one other such wheel table, and mechanism for raising and lowering said carriage comprising non-rotatable screws having their lower ends mounted on the trolley, gearing comprising elements threaded to the screws, and an electric motor for driving said gearing, said gearing elements and motor being mounted on and movable vertically with the table-engaging carriage.

5. In mechanism of the class described, the combination with means passing a wheeled vehicle over the ground, a pit below it having wheel tables each equipped with means detachably latching it across the pit, and a track in the bottom of the pit passing under said tables, of a trolley travelable along said track, a table elevating carriage engageable with and separable from a table, on and reciprocal vertically above the trolley, movable between a position where it engages and lifts a table high enough so its latching mechanism may be released and a position low enough so that the trolley with said table and the wheeled load thereon may move along said track under one other such wheel table, and mechanism for raising and lowering said carriage comprising screws fixedly held in the trolley and extended vertically for the entire travel of the carriage, worm-wheels threaded to the screws and mounted on and vertically movable with said carriage and gearing for driving said wheels, mounted on said carriage.

6. In mechanism of the class described, the combination with means passing a wheeled vehicle over the ground, a pit below it having wheel tables each equipped with means detachably latching it across the pit, and a track in the bottom of the pit passing under said tables, of a trolley travelable along said track, a table elevating carriage engageable with and separable from a table, on and reciprocal vertically above the trolley, movable between a position where it engages and lifts a table high enough so its latching mechanism may be released and a position low enough so that the trolley with said table and the wheeled load thereon may move along said track under one other such wheel table, and mechanism for raising and lowering said carriage comprising non-rotatable screws rising from the trolley, extended vertically for the entire travel of the carriage, rotatable elements engaging the screws and mounted on said carriage, gearing for driving said elements, mounted on said carriage, and an electric motor mounted on the carriage, for driving said elements.

7. In mechanism of the class described, the combination with means passing a wheeled vehicle over the ground, a pit below it having wheel tables each equipped with means detachably latching it across the pit, and a track in the bottom of the pit passing under said tables, of a trolley travelable along said track, a table elevating carriage engageable with and separable from a table, on and reciprocal vertically above the trolley, movable between a position where it engages and lifts a table high enough so its latching mechanism may be released and a position low enough so that the trolley with said table and the wheeled load thereon may move along said track under one other such wheel table, and mechanism for raising and lowering said carriage comprising four screws non-rotatably held in the trolley, gears rotatable around and threaded to the screws, and a pair of parallel shafts mounted on the carriage, each connected to drive a pair of said gears, and a motor connected to drive both shafts, mounted on the carriage.

8. In mechanism of the class described, the combination with means passing a wheeled vehicle over the ground, a pit below it having wheel tables each equipped with means detachably latching it across the pit, and a track in the bottom of the pit passing under said tables, of a trolley travelable along said track, a table elevating carriage engageable with and separable from a table, on and reciprocal vertically above the trolley, movable between a position where it engages and lifts a table high enough so its latching mechanism may be released and a position low enough so that the trolley with said table and the wheeled load thereon may move along said track under one other such wheel table, and mechanism for raising and lowering said carriage comprising an electric motor on the carriage, four non-rotatable screws rising from the trolley, worm-gears threaded to and rotatable around the screws, and a pair of parallel shafts on the carriage and driven by the motor, each shaft having a pair of worms engaging a pair of said gears, respectively.

9. In mechanism of the class described, the combination with means passing a wheeled vehicle over the ground, a pit below it having wheel tables, each equipped with means detachably latching it across the pit, one of said tables having rail-sections thereon and comprising longitudinal and cross-girders secured together to form a rigid structure, and a track in the bottom of said pit passing under said tables, of a trolley travelable along said track, a table elevating carriage vertically reciprocable above the trolley, movable between a position where it engages and lifts a table which it may be under high enough so its latching mechanism may be released, and a position low enough so that the trolley with said table and a wheeled load thereon may move along said track under one other such wheeled table, and mechanism for raising and lowering said carriage, said carriage comprising girders adapted to interfit with girders on a table.

10. In mechanism of the class described, the combination with means passing a wheeled vehicle over the ground, a pit below it having wheel tables, each equipped with means detachably latching it across the pit, one of said tables having rail-sections thereon and comprising longitudinal and cross girders secured together to form a rigid structure, and a track in the bottom of said pit passing under said tables, of a trolley travelable along said track, a table elevating carriage vertically reciprocable above the trolley, movable between a position where it engages and lifts a table which it may be under high enough so its latching mechanism may be released, and a position low enough so that the trolley with said table and a wheeled load thereon may move along said track under one other such wheeled table, and mechanism for raising and lowering said carriage, said carriage comprising pairs of girders adapted to interfit with girders on a table.

11. In mechanism of the class described, the combination with means passing a wheeled vehicle over the ground, a pit below it having wheel tables, each equipped with means detachably latching it across the pit, one of said tables having rail-sections thereon and comprising longitudinal and pairs of cross girders secured together to form a rigid structure, and a track in the bottom of said pit passing under said tables, of a trolley travelable along said track, a table elevating carriage vertically reciprocal above the trolley, movable between a position where it engages and lifts a table which it may be under high enough so its latching mechanism may be released, and a position low enough so that the trolley with said table and a wheeled load thereon may move along said track under one other such wheeled table, and mechanism for raising and lowering said carriage, said carriage comprising girders adapted to interfit with girders on a table.

12. In mechanism of the class described, the combination with means passing a wheeled vehicle over the ground, a pit below it having wheel tables, each equipped with means detachably latching it across the pit, one of said tables having rail-sections thereon and comprising longitudinal and pairs of cross girders secured together to form a rigid structure, and a track in the bottom of said pit passing under said tables, of a trolley travelable along said track, a table elevating carriage vertically reciprocal above the trolley, movable between a position where it engages and lifts a table which it may be under high enough so its latching mechanism may be released, and a position low enough so that the trolley with said table and a wheeled load thereon may move along said track under one other such wheeled table, and mechanism for raising and lowering said carriage, said carriage comprising pairs of girders adapted to interfit with girders on a table.

13. In mechanism of the class described, the combination with means passing a wheeled vehicle over the ground, a pit below it having wheel tables, each equipped with means detachably latching it across the pit, one of said tables having rail sections thereon and comprising longitudinal and cross girders secured together to form a rigid structure, and a track in the bottom of said pit passing under said tables, of a trolley travelable along said track, a table elevating carriage vertically reciprocable above the trolley, movable between a position where it engages and lifts a table which it may be under high enough so its latching mechanism may be released, and a position low enough so that the trolley with said table and a wheeled load thereon may move along said track under one other such wheeled table, and mechanism for raising and lowering said carriage, said carriage comprising girders to pass the cross-girders and engage the longitudinal girders of a table.

14. In mechanism of the class described, the combination with means passing a wheeled vehicle over the ground, a pit below it having wheel tables, each equipped with means detachably latching it across the pit, one of said tables having rail-sections thereon and comprising longitudinal and cross girders secured together to form a rigid structure, and a track in the bottom of said pit passing under said tables, of a trolley travelable along said track, a table elevating carriage vertically reciprocal above the trolley, movable between a position where it engages and lifts a table which it may be under high enough so its latching mechanism may be released, and a position low enough so that the trolley with said table and a wheeled load thereon may move along said track under one other such wheeled table, and mechanism for raising and lowering said carriage, said carriage comprising pairs of girders adapted to straddle the cross girders and engage the longitudinal girders of a table.

15. In mechanism of the class described, the combination with means passing a wheeled vehicle over the ground, a pit below it having wheel tables, each equipped with means detachably latching it across the pit, one of said tables having rail-sections thereon and comprising longitudinal and cross girders secured together to form a rigid structure, the cross-girders being secured under the longitudinal girders, and a track in the bottom of said pit passing under said tables, of a trolley travelable along said track, a table elevating carriage vertically reciprocal above the trolley, movable between a position where it engages and lifts a table which it may be under high enough so its latching mechanism may be released, and a position low enough so that the trolley with said table and a wheeled load thereon may move along said track under one other such wheeled table, and mechanism for raising and lowering said carriage, said carriage comprising pairs of girders adapted to straddle the cross-girders and engage the bottom of the longitudinal girders of a table.

16. In mechanism of the class described, the combination with means passing a wheeled vehicle over the ground, a pit below it having wheel tables, each equipped with means detachably latching it across the pit, one of said tables having rail-sections thereon and comprising longitudinal and pairs of cross girders secured together to form a rigid structure, and a track in the bottom of said pit passing under said tables, of a trolley travelable along said track, a table elevating carriage vertically reciprocal above the trolley, movable between a position where it engages and lifts a table which it may be under high enough so its latching mechanism may be released, and a position low enough so that the trolley with said table and a wheeled load thereon may move along said track under one other such wheeled table, and mechanism for raising and lowering said carriage, said carriage comprising pairs of girders adapted to straddle the pairs of cross-girders and engage the longitudinal girders of a table.

17. In mechanism of the class described, the combination with means passing a wheeled vehicle over the ground, a pit below it having wheel tables, each equipped with means detachably latching it across the pit, one of said tables having rail sections thereon and comprising pairs of longitudinal girders underlying the rail sections, longitudinal girders at the sides of the table and outside of the girders underlying the rail sections, and cross girders secured together to form a rigid structure, and a track in the bottom of said pit passing under said tables, of a trolley travelable along said track, a table elevating carriage vertically reciprocal above the trolley, movable between a position where it engages and lifts a table which it may be under high enough so its latching mechanism may be released, and a position low enough so that the trolley with said table and a wheeled load thereon may move along said track under one other such wheeled table, and mechanism for raising and lowering said carriage.

18. In mechanism of the class described, the combination with means passing a wheeled vehicle over the ground, a pit below it having wheel tables, each equipped with means detachably latching it across the pit, one of said tables having rail sections thereon and comprising pairs of longitudinal girders underlying the rail sections, longitudinal girders at the sides of the table and outside of the girders underlying the rail sections, and cross girders extended under all of the longitudinal girders and secured thereto to form a rigid structure, and a track in the bottom of said pit passing under said tables, of a trolley travelable along said track, a table elevating carriage vertically reciprocal above the trolley, movable between a position where it engages and lifts a table which it may be under high enough so its latching mechanism may be released, and a position low enough so that the trolley with said table and a wheeled load thereon may move along said track under one other such wheeled table, and mechanism for raising and lowering said carriage.

19. In mechanism of the class described, the combination with means passing a wheeled vehicle over the ground, a pit below it having wheel tables, each equipped with means detachably latching it across the pit, one of said tables having rail sections thereon and comprising a pair of longitudinal girders under each rail-section, longitudinal girders at the sides of the table, and pairs of cross-girders underlying and extending across all of said longitudinal girders and secured thereto to form a rigid structure, and a track in the bottom of said pit passing under said tables, of a trolley travelable along said track, a table elevating carriage vertically reciprocal above the trolley, movable between a position where it engages and lifts a table which it may be under high enough so its latching mechanism may be released, and a position low enough so that the trolley with said table and a wheeled load thereon may move along said track under one other such wheeled table, and mechanism for raising and lowering said carriage.

20. In mechanism of the class described, the combination with means passing a wheeled vehicle over the ground, a pit below it having wheel tables each equipped with means detachably latching it across the pit, and a track in the bottom of the pit passing under said tables, of a trolley travelable along said track, a table elevating carriage engageable with and separable from a table, on and reciprocal vertically above the trolley, movable between a position where it engages and lifts a table high enough so its latching mechanism may be released and a position low enough so that the trolley with said table and the wheeled load thereon may move along said track under one other such wheel table, and mechanism for raising and lowering said carriage comprising screws rising from the trolley, rotatable gears around the screws and on the carriage, mechanism for driving the gears, and lubricant retaining cases around said gears.

21. In mechanism of the class described, the combination with means passing a wheeled vehicle over the ground, a pit below it having wheel tables each equipped with means detachably latching it across the pit, and a track in the bottom of the pit passing under said tables, of a trolley travelable along said track, a table elevating carriage engageable with and separable from a table, on and reciprocal vertically above the trolley, movable between a position where it engages and lifts a table high enough so its latching mechanism may be released and a position low enough so that the trolley with said table and the wheeled load thereon may move along said track under one other such wheel table, and mechanism for raising and lowering said carriage comprising screws rising from the trolley, rotatable gears around the screws and on the carriage, mechanism for driving the gears, and lubricant retaining cases around said gears, fixed to said carriage.

22. In mechanism of the class described, the combination with means passing a wheeled vehicle over the ground, a pit below it having wheel tables each equipped with means detachably latching it across the pit, and a track in the bottom of the pit passing under said tables, of a trolley travelable along said track, a table elevating carriage engageable with and separable from a table, on and reciprocal vertically above the trolley, movable between a position where it engages and lifts a table high enough so its latching mechanism may be released and a position low enough so that the trolley with said table and the wheeled load thereon may move along said track under one other such wheel table, and mechanism for raising and lowering said carriage comprising screws rising from the trolley, rotatable gears around the screws and on the carriage, worms engaging the gears, an electric motor on the carriage, connected to drive said worms, and lubricant retaining cases in which said gears and worms are mounted.

23. In mechanism of the class described, the combination with means passing a wheeled vehicle over the ground, a pit below it having wheel tables, each equipped with means detachably latching it across the pit, and a track in the bottom of the pit passing under said tables, of a trolley travelable along said track, a table elevating carriage separably engageble with a table, on and reciprocal vertically above the trolley, movable between a position where it engages and lifts a table high enough so its latching mechanism may be released and a position low enough so that the trolley with said table and a wheeled load thereon may move along said track under one other such wheel table, said carriage comprising pairs of girders fixedly secured together to form a rigid structure, and adapted to engage a table, and mechanism for raising and lowering the carriage comprising screws having their lower ends non-rotatably secured in the trolley, and their upper ends adapted to pass between the girders of said pairs and rotatable elements on the carriage.

24. In mechanism of the class described, the combination with means passing a wheeled vehicle over the ground, a pit below it having wheel tables, each equipped with means detachably latching it across the pit, and a track in the bottom of the pit passing under said tables, of a trolley travelable along said track, a table elevating carriage on and reciprocal vertically above the trolley, movable between a position where it engages and lifts a table high enough so its latching mechanism may be released and a position low enough so that the trolley with said table and a wheeled load thereon may move along said track under one other such wheel table, said carriage comprising pairs of girders fixedly secured together to form a rigid structure and adapted to engage a table, mechanism for raising and lowering the carriage comprising screws having their lower ends non-rotatably secured in the trolley and their upper ends adapted to pass between the girders, rotatable elements on the carriage, engaging the screws, and a motor on said carriage, lubricant retaining cases around said elements and through which the screws pass, each case being fixed to a pair of girders.

25. In mechanism of the class described, the combination with means passing a wheeled vehicle over the ground, a pit below it having wheel tables, each equipped with means detachably latching it across the pit, and a track in the bottom of the pit passing under said tables, of a trolley travelable along said track, a table elevating carriage on and reciprocal vertically above the trolley, movable between a position where it engages and lifts a table high enough so its latching mechanism may be released and a position low enough so that the trolley with said table and a wheeled load thereon may move along said track under one other such wheel table, said carriage comprising pairs of girders fixedly secured together to form a rigid structure and adapted to engage a table, mechanism for raising and lowering the carriage comprising screws having their lower ends non-rotatably secured in the trolley and their upper ends adapted to pass between the girders, rotatable elements on the carriage engaging the screws, and a motor on said carriage, and lubricant retaining cases around said elements and through which the screws pass, secured to and disposed under the girders.

26. In mechanism of the class described, the combination with means passing a wheeled vehicle over the ground, a pit below it having wheel tables, each equipped with means detachably latching it across the pit, and a track in the bottom of the pit passing under said tables, of a trolley travelable along said track, a table elevating carriage on and reciprocal vertically above the trolley, movable between a position where it engages and lifts a table high enough so its latching mechanism may be released and a position low enough so that the trolley with said table and a wheeled load thereon may move along said track under one other such wheel table, said carriage comprising girders fixedly secured together to form a rigid structure, and adapted to engage a table, and mechanism for raising and lowering the carriage comprising screws having their lower ends non-rotatably secured in the trolley and their upper ends adapted to pass between the girders, rotatable elements on the carriage engaging the screws, driving mechanism for said elements, on the carriage, and cases for said elements, on which the girders are supported.

27. In mechanism of the class described, the combination with means passing a wheeled vehicle over the ground, a pit below it having wheel tables, each equipped with means detachably latching it across the pit, and a track in the bottom of the pit passing under said tables, of a trolley travelable along said track, a table elevating carriage on and reciprocal vertically above the trolley, movable between a position where it engages and lifts a table high enough so its latching mechanism may be released and a position low enough so that the trolley with said table and a wheeled load thereon may move along said track under one other such wheel table, said carriage comprising girders fixedly secured together to form a rigid structure, and adapted to engage a table, and mechanism for raising and lowering the carriage comprising screws having their lower ends non-rotatably secured in the trolley and their upper ends adapted to pass between the girders, rotatable elements on the carriage, engaging the screws, driving mechanism for said elements, on the carriage, and cases for said elements, underlying and supporting the girders.

28. In mechanism of the class described, the combination with means passing a wheeled vehicle over the ground, a pit below it having wheel tables, each equipped with means detachably latching it across the pit, and a track in the bottom of the pit passing under said tables, of a trolley travelable along said track, a table elevating carriage on and reciprocal vertically above the trolley, movable between a position where it engages and lifts a table high enough so its latching mechanism may be released and a position low enough so that the trolley with said table and a wheeled load thereon may move along said track under one other such wheel table, said carriage comprising girders fixedly secured together to form a rigid structure, and adapted to engage a table, and mechanism for raising and lowering the carriage comprising screws having their lower ends non-rotatably secured in the trolley and their upper ends adapted to pass between the girders, rotatable elements on the carriage, engaging the screws, and an electric motor connected to drive said elements, mounted on the carriage and between the girders.

29. In mechanism of the class described, the combination with means passing a wheeled vehicle over the ground, a pit below it having wheel tables each equipped with means detachably latching it across the pit, one of said tables having rail-sections thereon, and a track in the bottom of the pit passing under said tables, of a trolley travelable along said track, table elevating means engageable with and separable from the table, on and reciprocal vertically above the trolley, movable between a position where it engages and lifts a table high enough so its latching mechanism may be released and a position low enough so that the trolley with said table and a wheeled load thereon may move along said track under one other such wheel table, and power mechanism for raising and lowering said table engaging means, said latching means comprising a set of laterally slidable bolts to enter sockets in the walls of the pit.

30. In mechanism of the class described, the combination with means passing a wheeled vehicle over the ground, a pit below it having wheel tables each equipped with means detachably latching it across the pit one of said tables having rail sections thereon, and a track in the bottom of the pit passing under said tables, of a trolley travelable along said track, table elevating means engageable with and separable from the table, on and reciprocal vertically above the trolley, between a position where it engages and lifts a table high enough so its latching mechanism may be released and a position low enough so that the trolley with said table and a wheeled load thereon may move along said track under one other such wheel table, and mechanism for raising and lowering said latching means comprising a set of laterally slidable bolts under and in the vertical planes of the rail sections.

31. In mechanism of the class described, the combination with means passing a wheeled vehicle over the ground, a pit below it having wheel tables each equipped with means detachably latching it in pit-bridging position, one of said tables having rail-sections thereon and comprising rigidly connected girders underlying the rail-sections and forming a part of the table, said latching means comprising laterally slidable bolts in the horizontal plane of the girders, and a track in the bottom of said pit passing under said tables, of a trolley travelable along said track, a table elevating carriage engageable with and separable from a table, on and above the trolley and reciprocal vertically between a position where it engages and lifts a table which it may be under high enough so its bolts may be released, and a position low enough so that the trolley with a wheeled load thereon may move along under one other such table, and mechanism for raising and lowering the carriage.

32. In mechanism of the class described, the combination with means passing a wheeled vehicle over the ground, a pit below it having wheel tables each equipped with means detachably latching it in pit-bridging position, one of said tables having rail-sections thereon and comprising rigidly connected girders underlying the rail-sections and forming a part of the table, said latching means comprising laterally slidable bolts disposed in the horizontal plane of the girders, and a track in the bottom of said pit passing under said tables, of a trolley travelable along said track, a table elevating carriage engageable with and separable from the table, on and above the trolley, and reciprocal vertically, movable between a position where it engages and lifts a table which it may be under high enough so its bolts may be released, and a position low enough so that the trolley with a wheeled load thereon may move along under one other such table, and mechanism for raising and lowering the carriage, comprising screws on the trolley and elements on the carriage and engaging the screws.

33. In mechanism of the class described, the combination with means passing a wheeled vehicle over the ground, a pit below it having wheel tables each equipped with means detachably latching it across the pit, one of said tables having rail sections thereon and comprising rigidly connected girders underlying the rail-sections and forming a part of the table, said latching means comprising laterally slidable bolts in the horizontal plane of the girders, and a track in the bottom of said pit passing under said tables, of a trolley, travelable along said track, a table elevating carriage engageable with and separable from a table, on and above the trolley, and reciprocal between a position where it engages and lifts a table which it may be under high enough so its bolts may be released, and a position low enough so that the trolley with a wheeled load thereon may move along under one other such table, and mechanism for raising and lowering the carriage, comprising screws adapted to pass through a table and non-rotatably secured on the trolley, and rotatable elements on the carriage, and engaging the screws.

34. In mechanism of the class described, the combination with means passing a wheeled vehicle over the ground, a pit below it having wheel tables each equipped with means detachably latching it across the pit, one of said tables having rail sections thereon and comprising girders underlying and extending longitudinally of the rail sections and cross-girders beneath the longitudinal girders, said latching means comprising laterally slidable bolts above the plane of the cross-girders, and a track in the bottom of said pit passing under said tables, of a trolley travelable along said track, a table elevating carriage on and reciprocal vertically above the trolley, movable between the position where it engages and lifts a table which it may be under high enough so its bolts may be released, and a position low enough so that the trolley with a wheeled load thereon may move along under one other such table, and mechanism for raising and lowering the carriage.

35. In mechanism of the class described, the combination with means passing a wheeled vehicle over the ground, a pit below it having wheel tables each equipped with means detachably latching it in pit-bridging position, one of said tables having rail sections thereon and comprising pairs of rigidly connected girders underlying and extending longitudinally of the rail sections, said latching means comprising laterally slidable bolts mounted within the pairs of girders, and a track in the bottom of said pit passing under said tables, of a trolley travelable along said track, a table elevating carriage on and reciprocal vertically above the trolley, movable between the position where it engages and lifts a table which it may be under high enough so its bolts may be released, and a position low enough so that the trolley with a wheeled load thereon may move along under one other such table, and mechanism for raising and lowering the carriage.

36. In mechanism of the class described, the combination with means passing a wheeled vehicle over the ground, a pit below it having wheel tables each equipped with means detachably latching it across the pit, one of said tables having rail-sections thereon and comprising rigidly connected pairs of girders underlying and extending longitudinally of the rail-sections and forming a part of the table, said latching means comprising bolts slidable in guides within the pairs of girders, and a track in the bottom of said pit passing under said tables, of a trolley travelable along said track, a table elevating carriage on and reciprocal vertically above the trolley, movable between the position where it engages and lifts a table which it may be under high enough so its bolts may be released, and a position low enough so that the trolley with a wheeled load thereon may move along under one other such table, and mechanism for raising and lowering the carriage.

37. In mechanism of the class described, the combination with means passing a wheeled vehicle over the ground, a pit below it having wheel tables, each equipped with means detachably locking it across the pit, one of said tables having rail-sections thereon, and a track in the bottom of the pit passing under said tables, of a trolley travelable along said track comprising longitudinally extending girders and cross girders, a table elevating carriage, separably engageable with a table, on and reciprocal vertically above the trolley, movable between a position where it engages and lifts a table high enough so its latching mechanism may be released, and a position low enough so that the trolley with said table and a wheeled load thereon may move along said track under one other such wheel table, said carriage comprising girders fixedly secured together to form a rigid structure, and mechanism for raising and lowering the carriage comprising screws and power mechanism mounted on the carriage, the carriage being lowerable between the girders on the trolley.

38. In mechanism of the class described, the combination with means passing a wheeled vehicle over the ground, a pit below it having wheel tables, each equipped with means detachably locking it across the pit, one of said tables having rail-sections thereon, and a track in the bottom of the pit passing under said tables, of a trolley travelable along said track comprising longitudinal girders and cross-girders on top and at the ends of said longitudinal girders, a table elevating carriage comprising rigidly connected girders, separably engageable with a table, on and reciprocal vertically above the trolley, and movable between a position where it engages and lifts a table high enough so its latching mechanism may be released, and a position low enough so that the trolley with said table and a wheeled load thereon may move along said track under one other such wheel table, and mechanism for raising and lowering said carriage, comprising screws on the trolley and power-mechanism on the carriage, said carriage being lowerable between the cross-girders of the trolley.

39. In mechanism of the class described, the combination with means passing a wheeled vehicle over the ground, a pit below it having wheel tables, each equipped with means detachably locking it across the pit, one of said tables having rail-sections thereon, and a track in the bottom of the pit passing under said tables, of a trolley travelable along said track, comprising pairs of spaced longitudinal girders and cross-girders on top of the longitudinal girders, a table elevating carriage separably engageable with a table, on and reciprocal vertically above the trolley, and movable between a position where it engages and lifts a table high enough so its latching mechanism may be released and a position low enough so that the trolley with said table and a wheeled load thereon may move along said track under one other such wheel table, said carriage comprising girders fixedly secured together to form a rigid structure, mechanism for raising and lowering the carriage comprising screws and power mechanism mounted on the carriage, and blocks fixed between the spaced girders of the longitudinal pairs of the trolley, in which said screws are fixedly secured.

40. In mechanism of the class described, the combination with means passing a wheeled vehicle over the ground, a pit below it having wheel tables each equipped with means detachably latching it across the pit, and a track in the bottom of the pit passing under said tables, of a trolley travelable along said track, a table elevating carriage engageable with and separable from the table, on and reciprocal vertically above the trolley, movable between a position where it engages and lifts a table high enough so its latching mechanism may be released and a position low enough so that the trolley with said table and the wheeled load thereon may move along said track under one other such wheel table, mechanism for raising and lowering said carriage comprising an electric motor mounted on said carriage, and means independent of the motor for propelling the trolley.

41. In mechanism of the class described, the combination with means passing a wheeled vehicle over the ground, a pit below it having wheel tables each equipped with means detachably latching it across the pit, and a track in the bottom of the pit passing under said tables, of a trolley travelable along said track, a table elevating carriage engageable with and separable from the table, on and reciprocal vertically above the trolley, movable between a position where it engages and lifts a table high enough so its latching mechanism may be released and a position low enough so that the trolley with said table and the wheeled load thereon may move along said track under one other such wheel table, mechanism for raising and lowering said carriage comprising an electric motor mounted on said carriage, and manually operable gearing for propelling the trolley.

42. In mechanism of the class described, the combination with means passing a wheeled vehicle over the ground, a pit below it having wheel tables each equipped with means detachably latching it across the pit, and a track in the bottom of the pit passing under said tables, of a trolley travelable along said track, a table elevating carriage engageable with and separable from the table, on and reciprocal vertically above the trolley, movable between a position where it engages and lifts a table high enough so its latching mechanism may be released and a position low enough so that the trolley with said table and the wheeled load thereon may move along said track under one other such wheel table, mechanism for raising and lowering said carriage comprising an electric motor mounted on said carriage, and manually operable gearing for propelling the trolley, comprising a toothed wheel, a dog engageable with the toothed wheel and a hand-lever for operating said dog.

43. In mechanism of the class described, the combination with means passing a wheeled vehicle over the ground, a pit below it having wheel tables, each equipped with means detachably latching it across the pit, one of said tables having rail-sections thereon and comprising rigidly mounted longitudinal and cross-girders, and a track in the bottom of said pit passing under said tables, of a trolley travelable along said track, a table elevating carriage of girder construction, separably engageable with a table on, and vertically reciprocable above the trolley, movable between a position where it engages and lifts a table which it may be under high enough so its latching mechanism may be released and a position low enough so that the trolley with said table and a wheeled load thereon may move along said track under one other such wheeled table, mechanism for raising and lowering said carriage comprising screws on the trolley and power mechanism on said carriage, and a set of guides retaining a table in proper position on the carriage.

44. In mechanism of the class described, the combination with means passing a wheeled vehicle over the ground, a pit below it having wheel tables, each equipped with means detachably latching it across the pit, one of said tables having rail-sections thereon and comprising rigidly connected longitudinal and cross-girders, and a track in the bottom of said pit passing under said tables, of a trolley travelable along said track, a table elevating carriage of girder construction, separately engageable with the table, on and vertically reciprocable above the trolley, movable between a position where it engages and lifts a table which it may be under high enough so its latching mechanism may be released and a position low enough so that the trolley with said table and a wheeled load thereon may move along said track under one other such wheeled table, mechanism for raising and lowering said carriage, comprising screws on the trolley and power-mechanism on said carriage, and a set of guides coacting with the girders of a table to properly position and retain it on the carriage.

45. In mechanism of the class described, the combination with means passing a wheeled vehicle over the ground, a pit below it having wheel tables, each equipped with means detachably latching it across the pit, one of said tables having rail-sections therein and comprising rigidly connected longitudinal and cross-girders, and a track in the bottom of said pit passing under said tables, of a trolley travelable along said track, a table elevating carriage of girder-construction, separately engageable with a table, on and vertically reciprocable above the trolley, movable between a position where it engages and lifts a table which it may be under high enough so its latching mechanism may be released, and a position low enough so that the trolley with said table and a wheeled load thereon may move along said track under one other such wheeled table, mechanism for raising and lowering said carriage comprising screws on the trolley and power mechanism on said carriage, and a set of guides projecting upwardly from the carriage to lap the girders of a table and retain it in proper position on the carriage.

46. In mechanism of the class described, the combination with means passing a wheeled vehicle over the ground, a pit below it having wheel tables each equipped with means detachably latching it across the pit, and a track in the bottom of the pit passing under said tables, of a trolley travelable along said track, a table elevating carriage, engageable with and separable from a table, on and reciprocal vertically above the trolley, movable between a position where it engages and lifts a table high enough so its latching mechanism may be released and a position low enough so that the trolley with said table and a wheeled load thereon may move along said track under one other such wheel table, and power means for raising and lowering said carriage comprising a multiplicity of stationary screws rising from the trolley and rotatable elements around the screws and on said table-engaging carriage.

47. In mechanism of the class described, the combination with means passing a wheeled vehicle over the ground, a pit below it having wheel tables each equipped with means detachably latching it across the pit, and a track in the bottom of the pit passing under said tables, of a trolley travelable along said track, a table elevating carriage engageable with and separable from a table, on and reciprocal vertically above the trolley, movable between a position where it engages and lifts a table high enough so its latching mechanism may be released and a position low enough so that the trolley with said table and a wheeled load thereon may move along said track under one other such wheel table, and power-means manipulating said carriage comprising a multiplicity of stationary screws rising from the trolley, rotatable elements on the screws, and gearing for conjointly rotating said elements, said elements and gearing being carried on the table-engaging carriage.

48. In mechanism of the class described, the combination with means passing a wheeled vehicle over the ground, a pit below it having wheel tables each equipped with means detachably latching it across the pit, and a track in the bottom of the pit passing under said tables, of a trolley travelable along said track, a table elevating carriage separably engageable with a table, on and reciprocal vertically above the trolley, movable between a position where it engages and lifts a table high enough so its latching mechanism may be released and a position low enough so that the trolley with said table and a wheeled load thereon may move along said track under one other such wheel table, and power means for raising and lowering said carriage comprising a multiplicity of stationary screws rising from the trolley, worm wheels traversing in unison said screws, and a motor, said worm wheels and motor being carried on said carriage.

49. In mechanism of the class described, in combination with means passing a wheeled vehicle over the ground, and a pit below it, having a multiplicity of separated wheel tables each equipped with means detachably latching it across said pit, a track in the bottom of the pit passing under said tables, a trolley travelable along said track, table elevating means on and reciprocal vertically above the trolley, movable between a position where it engages and lifts a table which it may be under, high enough so its latching mechanism may be released, and a position low enough so that the trolley with said table and a wheel load thereon may move along said track under one or more other such wheel tables, and angular guides insuring proper interfitting of the table elevating means and adjacent wheel table.

OSCAR L. COFFEY